March 10, 1970  A. F. WICKERSHAM, JR., ET AL  3,500,208
SPARK TRANSMITTER

Filed Feb. 28, 1967  2 Sheets-Sheet 1

INVENTORS.
ARTHUR F. WICKERSHAM, JR.
LAMBERT T. DOLPHIN, JR.
BY
CHARLES D. B. CURRY
ATTORNEY.

United States Patent Office 3,500,208
Patented Mar. 10, 1970

3,500,208
SPARK TRANSMITTER
Arthur F. Wickersham, Jr., Atherton, and Lambert T. Dolphin, Jr., Palo Alto, Calif., assignors, by mesne assignments, to the United States of America as represented by the Secretary of the Navy
Filed Feb. 28, 1967, Ser. No. 619,905
Int. Cl. H04b 1/04
U.S. Cl. 325—106
2 Claims

ABSTRACT OF THE DISCLOSURE

A spark transmitter having a plurality of storage capacitors and spark gaps arranged in series and in a straight line where the spark gaps are alternately positioned between the capacitors. A low inductance outer cylindrical conductor and conducting end plates enclose and electrically connect the line of capacitors and spark gaps to provide a low inductance return current path. A longitudinally extending half-wave dipole is disposed between the inner and outer conductors and the opposite ends of the dipole extend through and beyond the end plates so that the outer conductor and the dipole together form a half-wave radiator of the generated power.

---

The present invention relates to a power generation device and more particularly to a high power, high frequency power generating device that operates by discharging electrical energy from storage capacitors through an inductor.

It is well known that radio waves can be generated by storing electricity in a capacitor and suddenly discharging it through an inductor. A convenient means for effecting this sudden discharge of stored energy is through a spark gap which breaks down when the capacitor has been charged to a predetermined energy level. Such a radio wave generating system has a frequency limitation which is primarily based on the self-inductance of the capacitors of the system. The frequency of oscillation of a capacitor-inductor-spark system is given by the relationship $f = 1/(2\pi\sqrt{LC})$ where $f$ is the frequency of oscillation, $L$ is the inductance and $C$ is the capacitance. From this it can be seen that if high frequencies are desired, the inductance $L$, or the capacitance $C$, or both, must be kept small. Since the radiated power is proportional to the stored power, very large powers can be radiated only by the use of large capacitors. However, with large capacitors it is difficult to maintain the inductance $L$, small, and therefore the self-inductance and lead-inductance of the large capacitors preclude high frequency operation. For many applications it is desirable to have both high power and high frequency radio wave generation.

One technique for achieving the generation of high frequencies and high powers which has been previously proposed is the utilization of capacitors arranged in a circle, charged in parallel, and discharged in series through spark gaps disposed between the capacitors. This has been referred to as a spark ring transmitter and by using this transmitter it is possible to achieve very large series potentials of many millions of volts even though the charging potentials are only tens of kilovolts. In addition, the lead length of each capacitor is very short because it does not, by itself, complete a circuit and therefore the lead inductance can be small and the operating frequency high. In this type of spark ring transmitter, the loop inductance of the ring is tuned to resonance by the capacitance distributed around the ring which provides an inherent peak power limitation since it is difficult to extend the frequencies to higher ranges without serious reduction of capacitance. At a frequency of about 150 mc./sec. the capacitance required to tune a practical ring is small, the energy storage capability is therefore correspondingly small, and therefore the peak power radiated is also small. For example, a typical 150 mc./sec. ring transmitter has a storage capacity of about $5 \times 10^{-2}$ joules and, at a typical 10% efficiency, radiates peak power of only about 50 kw.

An object of the present invention is to provide a transmitter that is capable of providing very high peak powers at very high radio frequencies.

Briefly, the present invention comprises a plurality of storage capacitors and spark gaps arranged in series and in a straight line where the spark gaps are alternately positioned between the capacitors. A low inductance outer cylindrical conductor and conducting end plates enclose and electrically connect the line of capacitors and spark gaps to provide a low inductance return current path. The line of capacitors and spark gaps function as an inner conductor. In operation, the capacitors are initially charged to operating potential and then discharged across the spark gaps. The discharge of the capacitors results in current flow through the inner conductor (comprising the capacitors and spark gaps), the low impedance end plates, and the outer conductor. Since the distributed industance and capacitance between the inner and outer conductors is similar to that of a coaxial transmission line, the geometry being similar, the inductance of the return path can be made very small by making the diameter of the inner conductor almost as large as the diameter of the outer conductor. Thus, very high frequencies can be achieved even though the series capacitors are quite large which is necessary in order to achieve large power. Radio energy can be obtained from these devices through coupling loops or probes placed in the cylinder.

Other objects and many of the attendant advantages of this invention will be readily appreciated as the same becomes better understood by reference to the following detailed description when considered in connection with the accompanying drawings wherein.

Figure 1:
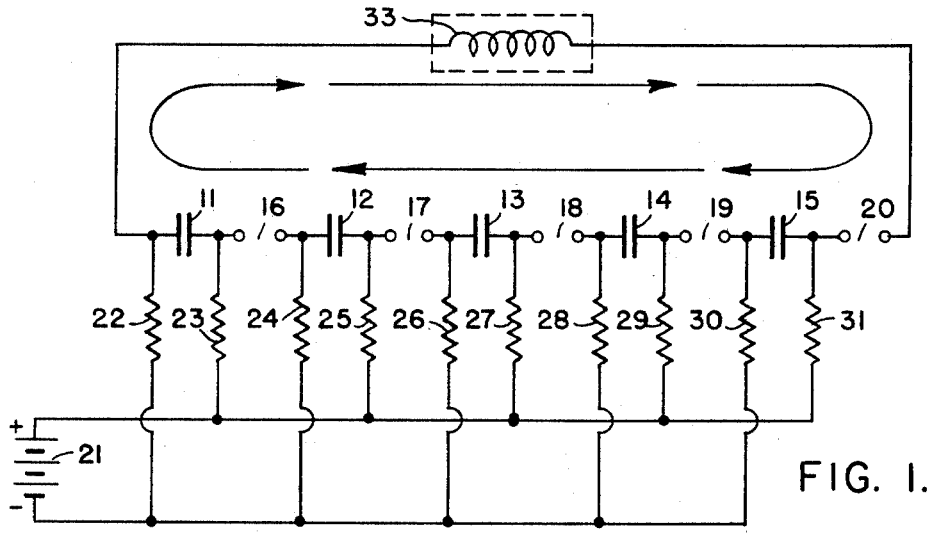
FIG. 1 is a schematic diagram of the electrical circuit of the present invention.

FIG. 1 is a schematic diagram illustrating the electrical circuit of the present invention. In this circuit capacitors 11 through 15 are connected in series through spark gaps 16 through 20. Capacitors 11 through 15 are charged by direct current source 21 through resistors 22 through 31. It should be noted that the capacitors are charged in parallel through resistors 22 through 31 and are then discharged in series through equivalent inductance 33. The discharge current flow path is illustrated by the solid line arrows. In the preferred embodiment, all of capacitors 11 through 15 have the same values, spark gaps 16 through 20 have the same characteristics, and resistors 22 through 31 have the same values. This is because it is desirable, within allowable limits, to have all of the capacitors 11 through 15 discharge at the same time and from the same level.

Since each of the capacitors is charged in the same manner, a description of capacitor charging will be given only for capacitor 11. A potential is applied across capacitor 11 through resistors 22 and 23 by direct current source 21. Resistors 22 and 23 have relatively large resistance to isolate the radio frequency signals generated by the series discharge of capacitors 11 through 15 and to prevent short-circuiting or overloading of the D.C. supply when the gaps are discharged. It should be noted, however, that the value of resistors 22 and 23 must not be so large as to prevent the charging of capacitor 11 to its required value within the required time limit, that is, during the interim between discharges.

In operation, each of capacitors 11 through 15 are charged at the same rate through resistors 22 through 31 to a predetermined value. This predetermined value is determined by the series impedance or breakdown voltage across spark gaps 16 through 20. When the capacitors reach breakdown voltage they simultaneously discharge across the respective spark gaps. When this occurs, a current pulse through equivalent inductance 33 as indicated by by the current path shown by the solid line arrows. The capacitors are then recharged by direct current source 21 and the process repeated. Equivalent inductance 33 is the combined inductance of capacitors 11 through 15, spark gaps 16 through 20, capacitor lead lines and the return path of the outer conductor which is described below. The frequency of current pulses is primarily determined by the total series capacitance of capacitors 11 through 15 and the magnitude of the equivalent inductance 33. The frequency of operation is defined by the relationship $f = 1/2\pi\sqrt{LC}$ where $f$ is the frequency of oscillation, L is the inductance and C is the capacitance. Since high frequencies are desired, it is necessary to maintain L or C, or both, at small values. The primary purpose of the present invention is to reduce the inductance L to the minimum possible value.

Figure 2:
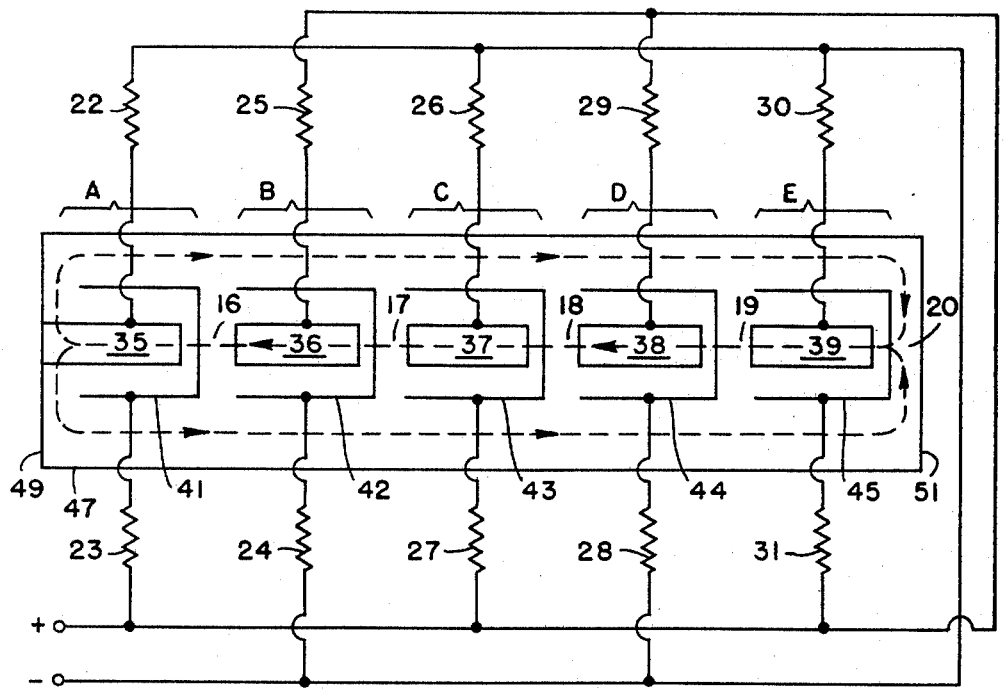
FIG. 2 is a schematic diagram of the present invention wherein the mechanical placement of the electrical elements and inner and outer conductors are illustrated.

In FIG. 2 is schematically illustrated the mechanical and electrical configuration of the radio frequency power generating device of the present invention. This device includes a plurality of capacitive sections indicated by the brackets and associated symbls A, B, C, D, and E. Each of these capacitive sections respectively includes inner cylindrical members 35 through 39 and intermediate cylindrical members 41 through 45. Each of cylindrical members 35 through 39 are preferably solid and have hemispherical ends. Surrounding each of inner cylindrical members 35 through 39 respectively are intermediate cylindrical members 41 through 45. In this manner a capacitor is formed by inner cylindrical member 35 and intermediate cylindrical member 41, which is referred to as capacitive section A. Capacitive sections B through E are formed in the same manner only using inner cylindrical members 36 through 39 and intermediate cylindrical members 42 through 45, respectively. Capacitive sections A through E are respectively separated by spark gaps 16 through 20 which together comprise the inner conductor. Outer cylindrical conductor 47 surrounds the inner conductor (capacitive sections A through E and spark gaps 16 through 20). The periphery of end plate 49 is mechanically and electrically connected to one end of outer member 47 and the central region is electrically and mechanically connected to one end of inner cylindrical member 35 of capacitive section A. The periphery of end plate 51 is mechanically and electrically connected to the opposite end of outer cylindrical member 47 and the central region is spaced from intermediate cylindrical member 45 thereby forming spark gap 20.

Inner cylindrical members 35 through 39 are alternately charged negative and positive respectively through resistors 22, 25, 26, 29, and 30. Intermediate cylindrical members 41 through 45 are alternately charged positive and negative respectively through resistors 23, 24, 27, 28, and 31. Since capacitive sections A through E are alternately charged, the discharge of these capacitive sections across spark gaps 16 through 20 will result in a series capacitive discharge. The spacing between outer cylindrical conductor 47 and intermediate cylindrical members 41 through 45 is preferably selected to be small so the inductance of the current return path will be small. The spacing and size of inner cylindrical members 35 through 39 respectively with respect to intermediate cylindrical members 41 through 45 are selected at values which meet the particular frequency and power (energy storage) requirements.

In operation, the current flow paths are as illustrated by the dotted lines shown in FIG. 2. It can be seen that the current flow path is through the inner conductor (capacitive sections A through E and spark gaps 16 through 20) across end plates 49 and 51 and along outer cylindrical conductor 47.

The method for designing transmission devices of the type described above may be as follows. Assuming it is desired to design a 90 mc./sec. transmission device, the following criteria may be employed. The inductance per meter can be computed from the equation for the inductance of a coaxial transmission line which is given by the expression:

$$L = \frac{138}{3} \cdot 10^{-2} \log_{10} \frac{D}{d}$$

where: L is the inductance in microhenries (H) per meter, D is the inside diameter of outer cylindrical conductor 47, and $d$ is the outside diameter of intermediate cylindrical members 41 through 45.

Selecting 10 capacitors of 150 picofarads capacitance, it can be seen that the total series capacitance is 15.0 pf. This series capacitance tunes the inductance to a resonant or operating frequency of $$f = 1/(2\pi\sqrt{LC}) = 86.3 \text{ mc./sec.}$$

In actual operation the resonant frequency was 90 mc./sec. Assuming the capacitors are charged to about 16 kv., the total stored energy per pulse is $$U = 1/2 CV^2 = \frac{1}{2}(10 \cdot 150 \cdot 10^{-12})(16 \cdot 10^3)^2 = 0.192 \text{ joules}$$

The length, to half-power amplitude, of the radiated pulse was about $40\mu s$; thus, the theoretical peak power was about 0.192 joules/40 $\mu$sec. or 4.80 megawatts. By measuring the received power at a distance point, it was determined that the peak power actually radiated was about 0.46 megawatts, which gives an efficiency of about 10 percent.

One embodiment of the present invention has supplied 1 to 5 mw. of peak power at .20 mc./sec. In this embodiment the transmitter was 4 feet long and used 8 storage capacitors of 1500 picofarads capacitance each. This device had the power and frequency capability of the conventional ring transmitter having a diameter of 12 feet and 67 capacitors each with 70 picofarads capacitance. As a further example, a 90 mc./sec. linear device was constructed that was capable of ½ mw. peak power and was only one meter in length. Since there is no limit to the length of these devices, it is possible to build generators capable of hundreds of megawatts peak power.

Figure 3:
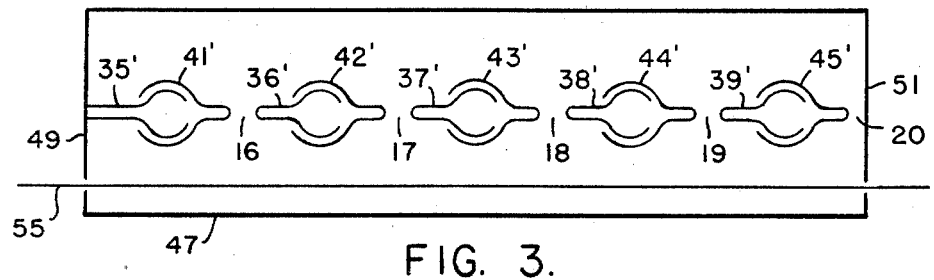
FIG. 3 is a schematic diagram of the present invention illustrating one type of radiating element.
Figure 4:
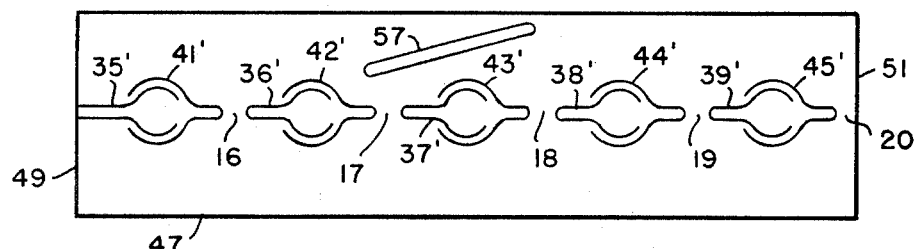
FIG. 4 is a schematic design of the present invention illustrating another type of radiating element.
Figure 5:
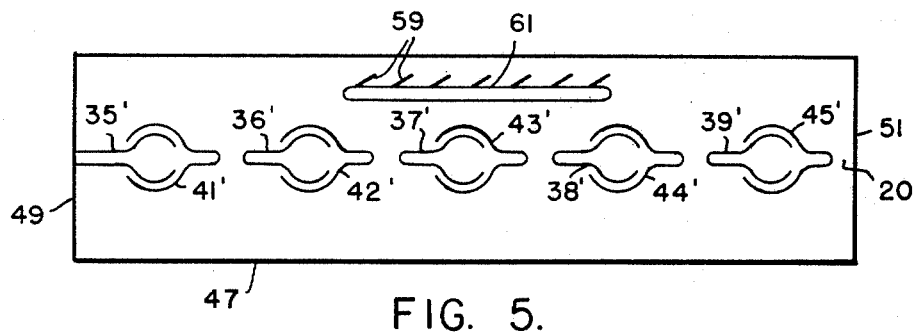
FIG. 5 is a schematic diagram of the present invention illustrating still another type of radiating element.

In FIGS. 3, 4 and 5 are illustrated different means for efficiently transmitting radio energy generated by the generator shown in FIG. 2. The generator shown in FIG. 2 is quite inefficient as a radiator or transmitter, since the outer conductor is a low impedance current path and therefore prevents strong electromagnetic or radio fields from being generated exterior to outer cylindrical conductor 47. Even though the signal generator shown in FIG. 2 has low efficiency, it is to be understood that for certain applications it will be quite satisfactory since it has the ability to generate exceptionally high power outputs and electromagnetic or radio signals will be therefore received in the surrounding media. However, if stronger electromagnetic or radio signals are desired in the surrounding media, the embodiments shown in FIGS. 3, 4 and 5 have various coupling loops that may be employed to increase the efficiency of the signal generator when operated as a transmitter.

Referring now to FIGS. 3, 4 and 5, the capacitor sections are made from inner members 35' through 39' and intermediate members 41' through 45'. The inner members are preferably hollow, have circular radial sections, and have an enlarged generally spherical configuration at one end that is smaller than but corresponds to the enlarged generally spherical configuration of intermediate members 41' through 45' into which they fit. The other ends of the inner members are elongated cylinders with hemispherical ends. Intermediate members 41' through 45' are hollow, have circular radial sections, and have an open ended generally spherical configuration at one end for respectively receiving inner members 35' through 39'. The other ends of the inner members are elongated cylinders with hemispherical ends that cooperate with the hemispherical ends of inner members 35' through 39' to provide reliable and efficient spark gaps.

In the FIG. 3 embodiment, a half wavelength dipole 55 is disposed in an off-axis position between the inner conductor (inner members 35' through 39', intermediate members 41' through 45' and spark gaps 16 through 20) and the outer cylindrical conductor 47. The dipole extends through openings in the conducting end plates at each end of the outer cylinder and projects about ⅛ of a wavelength beyond both ends of the outer cylinder. Dipole 55 is insulated from end plates 49 and 51 and from the inner and outer conductors. Together with the outer cylinder, the projecting ends of dipole 55 form an efficient half-wave radiator of the power generated inside the transmitter device.

The FIG. 4 embodiment differs from the FIG. 3 embodiment in that an offset elongated slot 57 is formed in the wall of outer cylindrical member 47 in place of dipole 55 of FIG. 3. Elongated slot 57 is offset at an angle to the longitudinal axis of outer cylindrical member 47. In this manner an electro-magnetic field is formed across slot 57 which efficiently radiates radio energy into the surrounding media.

The FIG. 5 embodiment differs from the FIG. 4 embodiment in that tuning screws 59, coupled with longitudinally aligned slot 61, are provided in the wall of outer cylindrical member 47 in place of offset elongated slot 57 in FIG. 4. Tuning screws 59 redirect the current direction in the wall of outer cylinder 47 so that an electromagnetic field is formed across slot 61 which efficiently radiates radio energy into the surrounding media.

Modifications and variations of the present invention are possible in the light of the above teachings. It is, therefore, to be understood that within the scope of the claims, the invention may be practiced otherwise than as specifically described.

What is claimed is:

1. A signal generating device having an inner conductor comprising at least one storage capacitor and at least one spark gap arranged alternately and in series, a hollow outer conductor surrounding said inner conductor, first means operatively connecting one end of said inner conductor to one end of said outer conductor, second means operatively connecting the other end of said inner conductor to the other end of said outer conductor, and a longitudinally extending member is disposed between the inside surface of said outer conductor and the outside surface of said inner conductor and extends through said first and second means for radiating to the surrounding media the power generated inside said signal generating device.

2. The signal generating device of claim 1 wherein said first and second means are respectively first and second end plates connected to opposite ends of said hollow outer conductor, said one end of said inner conductor is connected directly to said first end plate, and a spark gap is disposed between said other end of said inner conductor and said second end plate, said member being a longitudinally extending half-wave length dipole with the opposite ends of said dipole respectively extending through said first end plate and said second end plate, said opposite ends of said dipole extending about one-eighth of a wavelength beyond each of said first and second end plates whereby the opposite ends of said dipole and said outer conductor form a half-wave radiator of the power generated inside the signal generating device.

References Cited

UNITED STATES PATENTS

| | | | |
|---|---|---|---|
| 1,304,868 | 5/1919 | Franklin | 325—106 XR |
| 2,099,327 | 11/1937 | Brasch et al. | 331—127 XR |
| 2,405,217 | 8/1946 | Labin | 325—106 |
| 2,461,213 | 2/1949 | Hershberger | 325—106 XR |
| 3,388,287 | 6/1968 | Keenan | 331—126 XR |

JOHN W. CALDWELL, Primary Examiner

CARL R. VONHELLENS, Assistant Examiner

U.S. Cl. X.R.

325—26; 332—8